US012800441B2

(12) United States Patent
Self et al.

(10) Patent No.: US 12,800,441 B2
(45) Date of Patent: Nov. 17, 2026

(54) BALLAST DUMMY SYSTEMS AND METHODS

(71) Applicant: Universal City Studios LLC, Universal City, CA (US)

(72) Inventors: Gregory Self, Orlando, FL (US); Kenneth Walker, Orlando, FL (US); David Gerard Majdali, Orlando, FL (US); Gregory Paul Habiak, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 314 days.

(21) Appl. No.: 18/400,085

(22) Filed: Dec. 29, 2023

(65) Prior Publication Data

US 2025/0216296 A1 Jul. 3, 2025

(51) Int. Cl.
*G01M 99/00* (2011.01)
*G09B 23/30* (2006.01)

(52) U.S. Cl.
CPC ........... *G01M 99/004* (2013.01); *G09B 23/30* (2013.01)

(58) Field of Classification Search
CPC ........ G09B 9/28; G01M 99/004; G01B 23/10
See application file for complete search history.

(56) References Cited

U.S. PATENT DOCUMENTS 2,413,230 A 12/1946 Hohwieler
4,873,867 A * 10/1989 McPherson ....... G01M 17/0078 434/274
6,009,750 A * 1/2000 Maurer ............... G01M 99/001 73/172
6,083,144 A * 7/2000 Towley, III ........ A63B 21/0728 482/107
6,116,102 A * 9/2000 Faust .................. G01M 99/001 73/570
6,220,089 B1 * 4/2001 Gu .......................... G01M 7/02 73/172
6,730,004 B2 * 5/2004 Selsam .................. A63B 21/06 482/106
7,540,832 B2 * 6/2009 Krull .................... A63B 21/063 482/99

(Continued)

FOREIGN PATENT DOCUMENTS

CN 205785835 U 12/2016
DE 102005054542 A1 * 5/2007 ............. G09B 23/32

(Continued)

OTHER PUBLICATIONS

English translation of DE102006029045 (Year: 2007).*

(Continued)

*Primary Examiner* — Tran M. Tran
(74) *Attorney, Agent, or Firm* — Fletcher Yoder, P.C.

(57) ABSTRACT

A ballast dummy system includes a base support configured to be retained in a seat of a ride vehicle of an amusement ride. The ballast dummy system also includes at least one bar coupled to the base support and extending in an axial direction. The ballast dummy system also includes one or more weights. Each weight of the one or more weights includes an axial hole configured to engage the at least one bar to retain each weight on the base support. The at least one bar is configured to block rotation of the one or more weights about a vertical axis.

21 Claims, 8 Drawing Sheets

(56) References Cited

U.S. PATENT DOCUMENTS

| | | | | |
|---|---|---|---|---|
| 7,775,082 | B2 * | 8/2010 | Friedman | G01M 17/0074 73/12.06 |
| 7,794,373 | B2 | 9/2010 | Crawford et al. | |
| 8,337,365 | B2 * | 12/2012 | Kim | A63B 21/065 482/92 |
| 8,960,678 | B2 * | 2/2015 | Gilman | A63B 69/34 273/445 |
| 9,058,750 | B2 * | 6/2015 | Bohlender | G09B 9/46 |
| 9,721,484 | B2 * | 8/2017 | Waagmeester | G09B 23/28 |
| 10,722,774 | B2 * | 7/2020 | Creech | A63B 69/34 |
| 11,099,089 | B2 * | 8/2021 | Goodstadt | A63B 71/023 |
| 11,291,901 | B2 | 4/2022 | Wagner et al. | |
| 11,796,424 | B2 * | 10/2023 | Zamora | G09B 9/28 |
| 2007/0131043 | A1 * | 6/2007 | Frost | G09B 23/32 73/866.4 |
| 2016/0379525 | A1 | 12/2016 | Berkley | |
| 2018/0126287 | A1 | 5/2018 | Wilson et al. | |
| 2018/0328806 | A1 * | 11/2018 | Yamaguchi | G01L 25/006 |

FOREIGN PATENT DOCUMENTS

| | | | | |
|---|---|---|---|---|
| DE | 102006029045 | A1 * | 12/2007 | G01M 17/0078 |
| JP | 2000162086 | A * | 6/2000 | |
| KR | 0138337 | Y1 | 5/1999 | |
| RU | 2401152 | C2 | 10/2010 | |
| WO | 2005050592 | A1 | 6/2005 | |

OTHER PUBLICATIONS

English translation of DE102005054542 (Year: 2007).*

PCT/US2024/062031 Invitation to Pay Additional Fees mailed Mar. 25, 2025.

PCT/US2024/062031 International Search Report and Written Opinion mailed May 16, 2025.

Southwind MFG, "Accelerometer Protective Transport Module (APTM)", Sep. 9, 2015.

Southwind MFG, "A Smarter Dummy", Sep. 9, 2015.

Dacon, "Dacon Rescue Dummy|Manikin", Mar. 2023.

Schap, "J826 Adjustable Ballast Dummy", Jan. 27, 2023.

* cited by examiner

BALLAST DUMMY SYSTEMS AND METHODS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include an attraction system, such as a ride (e.g., roller coaster, train). Various aspects of the ride may be tested prior to the ride being opened to guests. For example, the ride may be tested by placing one or more dummies into a ride vehicle of the ride. Then, a testing system may take measurements as the one or more dummies are carried by the ride vehicle along a path (e.g., track) of the ride.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a ballast dummy system includes a base support configured to be retained in a seat of a ride vehicle of an amusement ride. The ballast dummy system also includes at least one bar coupled to the base support and extending in an axial direction. The ballast dummy system also includes one or more weights. Each weight of the one or more weights includes an axial hole configured to engage the at least one bar to retain each weight of the one or more weights on the base support. The at least one bar is configured to block rotation of the one or more weights about a longitudinal axis of the at least one bar.

A ballast dummy system includes a base support configured to be retained in a seat of a ride vehicle. The ballast dummy system also includes one or more bars coupled to the base support and extending in an axial direction. The ballast dummy system also includes one or more weights. Each weight of the one or more weights includes one or more axial holes configured to engage respective bars of the one or more bars. At least one weight of the one or more weights includes one or more recesses configured to retain one or more sensors.

In an embodiment, a method includes retaining a ballast dummy including a bar extending in an axial direction in a seat of a ride vehicle. The method also includes retaining a sensor in a first weight of one or more weights. The method also includes adding a first subset of weights of the one or more weights to the bar. The method also includes adding the first weight to the bar. The method also includes adding a second subset of weights of the one or more weights to the bar. The method also includes retaining the one or more weights on the bar.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
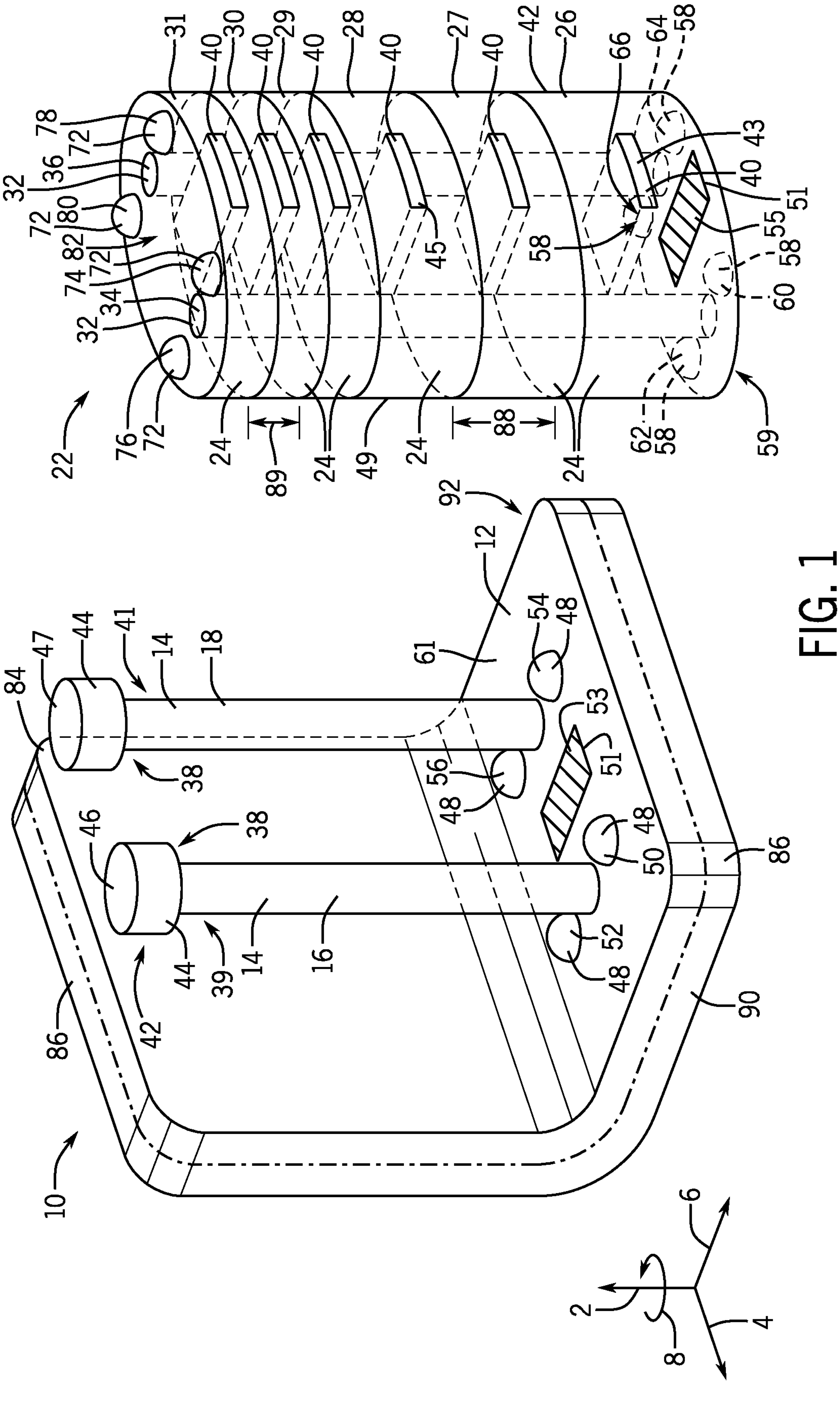
FIG. 1 is a perspective view of a ballast dummy system for a ride vehicle of an amusement ride, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1 percent of a target, within 1 percent of a target, within 5 percent of a target, within 10 percent of a target, within 25 percent of a target, and so on). Moreover, it should be understood that any exact values, numbers, measurements, and so on, provided herein, are contemplated to include approximations (e.g., within a margin of suitable or contemplatable error) of the exact values, numbers, measurements, and so on).

The present disclosure is directed to a ballast dummy system. The ballast dummy system may be utilized in any of a variety of environments and/or with any of a variety of vehicles. For example, the ballast dummy system may be utilized to test amusement ride systems. The ballast dummy system may include one or more bars (e.g., posts, rods) coupled to a base support (e.g., frame surrounded by cushioning material). The ballast dummy system may also include one or more weights configured to engage the one or more bars via one or more axial holes disposed on each weight of the one or more weights. The one or more weights may be configured to retain a sensor (e.g., accelerometer) via a recess, which may be disposed on a radial surface of the one or more weights. It may be appreciated that the ability to stack the one or more weights on the one or more bars may allow for ease of adjustment of a simulated weight of the ballast dummy system, as well as ease of adjustment of a desired height of the sensor.

In an embodiment, each weight of the one or more weights may include one or more recesses on a bottom axial end of the weight and one or more protrusions on a top axial end of the weight. Additionally, the base support may also include one or more protrusions disposed on an upwardly facing surface that holds (e.g., supports, contacts) the weights. The one or more protrusions are configured to align and engage with the one or more recesses so as to block rotation between the one or more weights and the base support. Additionally, when the one or more weights includes multiple weights, engagement of the one or more protrusions disposed on a first weight of the multiple weights and the one or more recesses disposed on a second weight of the multiple weights may block rotation between the first weight and the second weight of the multiple weights. In this way, the multiple weights may engage with one another to block rotation between the multiple weights to provide stability to a stack of multiple weights.

With the preceding in mind, FIG. 1 is a perspective view of an embodiment of a ballast dummy system 10 for a ride vehicle of an amusement ride. The ballast dummy system 10 includes a base support 12 (e.g., base portion) configured to be retained in a seat of the ride vehicle of the amusement ride. The seat may include a support for a passenger to ride in the ride vehicle while in a seated position. Additionally or alternatively, the seat of the ride vehicle may include a support to enable the passenger to stand, lay down, kneel, or the like. In FIG. 1, the ballast dummy system 10 and its components may be described with reference to an axial axis or direction 2 (e.g., vertical axis or direction), a first lateral axis or direction 4, a second lateral axis or direction 6, and/or a circumferential axis or direction 8.

In an embodiment, the base support 12 may be composed of any suitable material(s) with any suitable form, such as a synthetic material (e.g., foam, rubber, hard polymers) disposed about a rigid frame (e.g., tensioning rods). The ballast dummy system 10 also includes one or more bars 14 coupled to the base support 12 (e.g., the rigid frame). In an embodiment, the one or more bars 14 may include two or more bars. The one or more bars 14 may include posts, poles, rods, or the like. As shown, the one or more bars 14 (e.g., bar 16, 18) extend in an upward direction from an axially-facing surface of the base support 12 (e.g., substantially along the axial axis 2). As shown, the one or more bars 14 are parallel to one another (e.g., substantially parallel) and transverse (e.g., orthogonal, such as substantially orthogonal) to the axially-facing surface of the base support 12.

The ballast dummy system 10 also includes one or more weights 24. In FIG. 1, to facilitate discussion, the one or more weights 24 include multiple weights (e.g., separately labeled as weight 26, 27, 28, 29, 30, and 31) that together may be considered to form a set of weights 22. In an embodiment, the one or more weights 24 may be composed of a ballast material (e.g., metal, concrete) disposed within an outer layer composed of a softer (e.g., elastomeric) material (e.g., rubber, polymer). The one or more weights 24 may include one or more axial holes 32 (e.g., axial hole 34, 36; through holes), such that each axial hole 32 is configured to engage (e.g., receive, slide over, fit around) a respective bar of the one or more bars 14. The one or more bars 14 are configured to retain the one or more weights 24 via top portions 38 (e.g., top portions 39, 41) of each of the one or more bars 14 receiving and/or extending past the one or more axial holes 32 of the one or more weights 24. That is, the one or more weights 24 may be placed around the one or more bars 14 such that the one or more axial holes 32 surround a perimeter of the one or more bars 14. In an embodiment, the one or more weights 24 may be exposed (e.g., visible) and/or accessible while supported on the one or more bars 14, such that an operator may be able to visually assess the configuration of the one or more weights 24 and/or readily adjust the one or more weights 24. That is, the one or more weights 24 may be exposed to the operator so as to be easily removed and/or rearranged from the one or more bars 14. The ballast dummy system 10 may also include a securing system 42. The securing system 42 may include the one or more bars 14 and/or one or more fasteners 44 (e.g., fastener 46, 47) configured to couple to the one or more bars 14. The one or more fasteners 44 are configured to retain the one or more weights 24 via coupling (e.g., mating, engaging, threading) with the top portions 38 of the one or more bars 14. In an embodiment, the one or more fasteners 44 may be configured to couple to the one or more bars 14 to contact and exert a downward force on the one or more weights 24 to secure the one or more weights 24 to the base support 12. For example, when the one or more fasteners 44 include one or more nuts or other threaded fastener, the coupling of the one or more fasteners 44 and the one or more bars 14 may include fastening the one or more fasteners 44 onto the top portions 38 of the one or more bars 14 via an interlocking of threading disposed on the one or more fasteners 44 and corresponding threading disposed on the one or more bars 14. In this manner, the one or more fasteners 44 may be fastened onto the one or more bars 14 (e.g., via a tool and/or manually) via the threading, thereby maintaining contact with and a downward force on the one or more weights 24. It should be appreciated that the corresponding threading may extend along any suitable length (e.g., 25, 50, 75 or more percent) of the one or more bars 14 to enable the one or more fasteners 44 to contact and apply the downward force on the one or more weights 24. Additionally or alternatively, the one or more weights 24 may be retained onto (e.g., about, at least partially around) the one or more bars 14 via other components. For example, the one or more weights 24 may be retained on the one or more bars 14 via one or more collet pins, clasps, or the like. The securing system 42 may be configured to constrain the motion of the one or more weights 24 along the vertical axis 2 and/or the lateral axes 4 and 6 (e.g., lateral plane). Further, the securing system 42 may constrain rotation of the one or more weights 24 about the vertical axis 2. In this way, the securing system 42 may maintain the one or more weights 24 in a position (e.g., target position, initial position) during testing operations, for example, which may improve the testing operations by providing desired data, reduced wear, and so forth.

In an embodiment, at least one weight of the one or more weights 24 also includes one or more recesses 40 (e.g., recess 43, 45) disposed on an outer surface 49 (e.g., radial surface, circumferential surface) of the at least one weight of the one or more weights 24. The one or more recesses 40 may be configured to retain at least one sensor (e.g., accelerometer, inertial measurement unit (IMU), global positioning system (GPS) sensor, gyroscope) configured to measure one or more kinematic properties (e.g., position, acceleration, orientation) of the ballast dummy system 10 during a ride sequence (e.g., test run) of the amusement ride. In an embodiment, each weight of the one or more weights 24 may include one or more respective recesses of the one or more recesses 40 disposed on a respective outer surface 49 to retain the at least one sensor.

In an embodiment, the base support 12 includes protrusions 48 (e.g., protrusion 50, 52, 54, 56) disposed on a top surface 61 (e.g., axial-facing surface) of the base support 12 and laterally offset from the one or more bars 14. As shown, the protrusions 50 and 52 (e.g., bumps, bulges, projections, conical humps) are laterally offset from (e.g., along the first lateral axis 4) the bar 16, and the protrusions 54 and 56 are laterally offset from (e.g., along the first lateral axis 4) the bar 18. Additionally, the weight 26 is illustrated as having recesses 58 (e.g., recess 60, 62, 64, and 66) disposed on a bottom axial end 59 (e.g., surface) and laterally offset from the one or more axial holes 32, such that a spacing of the recesses 58 (e.g., cavities, pockets, apertures) of the weight 26 corresponds to a spacing of the protrusions 48 on the base support 12. In the illustrated embodiment, the recesses 60 and 62 are laterally offset (e.g., along the first lateral axis 4) from the axial hole 34, and the recesses 64 and 66 are radially and/or laterally offset from (e.g., along the first lateral axis 4) the axial hole 36. The recesses 58 of the weight 26 may be configured to engage the protrusions 48 disposed on the base support 12, thereby blocking rotation of the weight 26 relative to the base support 12 about the one or more bars 14 and/or lateral movement in a plane spanning the first lateral axis 4 and the second lateral axis 6. It should be appreciated that each weight of the one or more weights 24 may also include respective recesses 58 (e.g., on respective bottom axial ends 59) that are spaced to substantially align with the spacing of the recesses 58 on the weight 26. In this way, any of the one or more weights 24 may be positioned to contact the base support 12 and to engage the protrusions 48 on the base support 12.

Additionally or alternatively, the one or more weights 24 and/or the base support 12 may include one or more rough surfaces 51 (e.g., rough surface 53, 55) configured to increase friction between the one or more weights 24 when the one or more weights 24 include the multiple weights stacked relative to one another and/or increase friction between the one or more weights 24 and the base support 12. Although the illustrated embodiment shows the rough surfaces 51 as being disposed on the top surface 61 of the base support 12 and a bottom surface 63 of the weight 26, it should be recognized that the rough surfaces 51 may be disposed elsewhere on the base support 12 and/or any weight of the one or more weights 24 (e.g., weights 26, 27, 28, 29, 30, or 31 in the set of weights 22). Further, the rough surfaces 51 may extend across an entirety or any suitable portion of the one or more weights 24 and/or the base support 12. It should be recognized that the one or more rough surfaces 51 may impede lateral motion of the one or more weights 22 (e.g., in directions 2 and/or 4) and/or vertical motion of the one or more weights 22 along the one or more bars 14 (e.g., in the direction 2).

Additionally, as shown in the illustrated embodiment, the weight 31 is shown to include protrusions 72 (e.g., protrusion 74, 76, 78, and 80) disposed on a top axial end 82 (e.g., surface). As shown, a spacing of the protrusions 72 substantially aligns with the recesses 58 and the protrusions 48. It should be appreciated that each weight of the one or more weights 24 may also include respective protrusions 72 disposed on respective top axial ends 82 and that correspond to (e.g., substantially align with) the recesses 58 and the protrusions 48. Thus, the recesses 58 on the respective bottom axial ends 59 and the protrusions 72 on the respective top axial ends 82 engage when the one or more weights 24 include the multiple weights stacked relative to one another, thereby limiting and/or blocking rotation and/or lateral movement of the multiple weights relative to one another, as well as further aligning the multiple weights with the one or more bars 14. In an embodiment, the base support 12 may include one or more recesses and each weight of the one or more weights 24 may have protrusions disposed on respective bottom axial ends 59 and recesses disposed on respective top axial ends 82. In this manner, the protrusions and recesses may block relative rotation and/or lateral movement between the one or more weights 24 and the base support 12, as discussed herein. Thus, each weight of the one or more weights 24 may be configured to engage the base support 12 via a key-slot interface (e.g., protrusion-recess interface; when selected and positioned adjacent to the base support 12). Further, when the one or more weights 24 include the multiple weights stacked relative to one another, the multiple weights may be configured to engage one another via key-slot interfaces (e.g., protrusion-recess interfaces).

In the illustrated embodiment, the base support 12 includes a back support portion 84 that extends in an upward direction (e.g., substantially along the axial axis 2). When the ballast dummy system 10 is placed in the seat of the ride vehicle, the back support portion 84 may be disposed between the weights 24 (e.g., and one or more bars 14) and the seat of the ride vehicle, so as to provide a barrier (e.g., cushioning barrier) between the weights 24 and the seat. In an embodiment, the back support portion 84 may extend at least beyond the top portions 38 of the one or more bars 14 in the axial direction 2. The base support 12 (e.g., and back support portion 84) may include an outer deformable layer 86 configured to deform in response to a force applied to the outer deformable layer 86, such as in response to retaining the ballast dummy system 10 in the seat of the ride vehicle. In response to a removal of the force (e.g., removing the ballast dummy system 10 from the ride vehicle), the outer deformable layer 86 may return to its initial shape. In this manner, the outer deformable layer 86 may enable the ballast dummy system 10 to adapt its shape to (e.g., be retained by) ride vehicle seats of various shapes and/or sizes. In an embodiment, the deformable layer 86 may be composed of a deformable material such as foam, latex, or the like.

In an embodiment, the one or more weights 24 may include the multiple weights having different weight values and/or mass values. In the illustrated embodiment, the weight 27 is shown as having a larger thickness 88 compared to a smaller thickness 89 of the weight 30, thereby indicating (e.g., visually to an operator) that the weight 26 may have a larger weight value and/or mass value compared to the weight 30. In an embodiment, a ballast material (e.g., steel, iron) may be used for each weight of the one or more weights 24, resulting in variation in a dimension in cases with the multiple weights and in order to form subsets (e.g., groupings) of the multiple weights having different weight values and/or mass values (e.g., 2.2 kilograms, 4.5 kilograms, 11.3 kilograms). For example, any weight of the one or more weights 24 having a higher weight value and/or mass value may have an increased thickness (e.g., along the axial axis 2), width (e.g., diameter; along the first lateral axis 4 and/or along the second lateral axis 6), or a combination thereof. In an embodiment, the one or more weights 24 may be color-coded according to the weight (e.g., 2.2 kilogram weights are red, 4.5 kilogram weights are green) and/or may have the weight value and/or mass value printed (e.g., engraved) in text on the outer surface 49 of each weight of the one or more weights 24. In an embodiment, different ballast materials may be used for the one or more weights 24. That is, the subsets of the multiple weights having different weight values and/or mass values may be a result of a change in a density of the ballast material between different subsets of the multiple weights. Thus, in an embodiment, the subsets of the multiple weights having different weight values and/or mass values may share a common thickness. Accordingly, the one or more weights 24 may include a first number of weights (e.g., 1, 2, 3, 4, or more weights) having a first weight value and/or mass value (e.g., 2.2 kilograms), a second number of weights (e.g., 1, 2, 3, 4, or more weights 24) having a second weight value and/or mass value (e.g., 4.5 kilograms), and so forth. In such cases, the first weight value and/or mass value and the second weight value and/or mass value may be achieved by varying a dimension of the weights and/or by varying a ballast material of the weights.

In an embodiment, a total weight value and/or total mass value of the one or more weights 24 retained onto the one or more bars 14 may mimic a weight and/or mass of a human who may ride in the ride vehicle. For example, the total weight value and/or total mass value of the one or more weights 24 may range from 11.3 to 34 kilograms, 22.6 kilograms to 136 kilograms, or 40.8 to 181.5 kilograms. In an embodiment, the one or more weights 24 may include the multiple weights stacked relative to one another in various configurations (e.g., orders) and retained onto the one or more bars 14 in a manner that mimics a variety of weight distributions of humans who may ride in the ride vehicle. For example, one distribution or configuration of the multiple weights may mimic a human with more weight near a midsection, whereas another distribution of the multiple weights may mimic a human with more weight in an upper body.

In the illustrated embodiment, when the one or more weights include the multiple weights stacked relative to one another, the multiple weights share or provide a common outer surface 49 (e.g., outer or radial contour, outer or radial shape) to form a generally continuous or smooth outer profile (e.g., radial profile). In an embodiment, the multiple weights may have different outer profiles. For example, the multiple weights may be organized by weight value and/or mass value such that the weights having different weight values and/or mass values additionally have different outer profiles, so as to further distinguish the weights having different weight values and/or mass values.

In an embodiment, the ballast dummy system 10 may include the one or more bars 14 such that each bar of the one or more bars 14 includes or supports its own weight(s) of the one or more weights 24. For example, the bar 16 may include four stacked weights of the one or more weights 24 (e.g., retained by the bar 16), and the bar 18 may include six stacked weights of the one or more weights 24 (e.g., retained by the bar 18). In this manner, each bar of the one or more bars 14 may retain separate weight(s) of the one or more weights 24, allowing for weight to be distributed evenly and/or unevenly on the base support 12 in any desirable manner.

Although the illustrated embodiment shows the bars 16, 18, the one or more bars 14 may include additional bars to retain the one or more weights 24. In an embodiment, a single bar 14 may be configured to retain the one or more weights 24. Similarly, though the illustrated embodiment shows the axial holes 34, 36 disposed on each weight of the one or more weights 24, one or more axial holes 32 may be disposed on each weight of the one or more weights 24 depending on a number of the one or more bars 14 used for retaining the one or more weights 24. For example, the number of axial holes 32 disposed on each weight of the one or more weights 24 may equal the number of the one or more bars 14 or, in an embodiment, may be greater than the number of the one or more bars 14. In an embodiment, each weight of the one or more weights 24 may include more axial holes 32 than the one or more bars 14 in order to provide for multiple configurations for each weight of the one or more weights 24 to be stacked onto the one or more bars 14. For example, the one or more bars 14 may include two bars, and each weight of the one or more weights 24 may have four axial holes 32, such that each axial hole 32 is radially and/or laterally disposed at an equal distance from a center of each weight of the one or more weights 24. In this manner, the one or more weights 24 may be stacked onto the one or more bars 14 via one or more unique configurations (e.g., orientations, rotations).

It should be appreciated that the ballast dummy system 10 may be placed in the ride vehicle with any suitable orientation relative to the ride vehicle. For example, in an embodiment, the base support 12 may extend in the axial direction 2, and the one or more bars 14 may extend in the second lateral direction 6 such that the one or more weights 24 may be added to the one or more bars 14 horizontally. In this manner, the ballast dummy system 10 may be configured to accommodate and test ride vehicles in which the passengers have different positions or orientations in the ride vehicles (e.g., standing ride vehicles). In an embodiment, the back support portion 84 may be configured to fold (e.g., via a hinge) and/or be removed such that the ballast dummy system 10 may be configured to accommodate and test a variety of ride vehicles.

In an embodiment, at least one weight of the one or more weights 24 may include the one or more recesses 40 disposed on the respective outer surface 49. For example, each weight of the one or more weights 24 may include one or more respective recesses of the one or more recesses 40 or, in an embodiment, a subset of the one or more weights 24 may include the one or more respective recesses of the one or more recesses 40. In some embodiments, at least one weight of the one or more weights 24 may include multiple respective recesses of the one or more recesses 40 disposed about the respective outer surface 49. For example, the at least one weight of the one or more weights 24 may include the multiple respective recesses spaced about the respective outer surface 49 to provide additional options for placement of the at least one sensor. In any case, the one or more recesses 40 may have the same dimensions or, in an embodiment, different dimensions. For example, the recess 43 may have a smaller width than a larger width of the recess 45 so as to accommodate a different type and/or size of sensor. Thus, the one or more weights 24 may include the one or more recesses 40 of one or more variations (e.g., variations of shape, variations of dimensions) to accommodate the at least one sensor of any of a variety of types and/or sizes, including different types and/or sizes from one another.

In an embodiment, the at least one weight of the one or more of the weights 24 may include one or more mechanisms for retaining the at least one sensor in the one or more recesses 40. For example, one or more clamps may be configured to retain the at least one sensor in the one or more recesses 40. In some embodiments, the at least one weight of the one or more weights 24 may include a sliding door (e.g., lid) disposed outside of an opening to the one or more recesses 40 to retain the at least one sensor inside the one or more recesses 40.

In an embodiment, the at least one sensor in the one or more recesses 40 may include or be coupled to a storage device that enables local storage of sensor data (e.g., signals). In an embodiment, the at least one sensor in the one or more recesses 40 may be a wireless sensor that is configured to wirelessly transmit the sensor data to another device or system, such as to a processing and/or storage device or system on the one or more weights 24, on the base support 12, on the ride vehicle, and/or remote from the one or more weights 24, the base support 12, and the ride vehicle. In such cases, the at least one sensor may include or be coupled to a power source (e.g., a replaceable and/or rechargeable battery). In an embodiment, at least one weight of the one or more weights 24 may be configured to support one or more sensor wires associated with the at least one sensor in the one or more recesses 40. Additionally or alternatively, the ballast dummy system 10 may include one or more conduits configured to hold (e.g., conduit) one or more wires (e.g., through the one or more bars 14) for powering the at least one sensor and/or transmitting the sensor data. In an embodiment, the one or more bars 14 and/or the one or more weights 24 may include contacts (e.g., electrical contacts) that transmit electrical power and/or data in response to a respective contact being electrically coupled to the contact. For example, in response to sliding the at least one sensor into the one or more recesses 40, the respective contact on the at least one sensor may electrically couple with the contact. In another example, in response to placing the one or more weights 24 onto the one or more bars 14, a respective contact located on the one or more weights 24 may electrically couple with the contact. In this manner, any electrical equipment (e.g., batteries, transmitters) associated with the at least one sensor may be stored at another location in the ballast dummy system 10, and the time utilized to setup the at least one sensor may be reduced.

In an embodiment, the ballast dummy system 10 may include a weighted covering (e.g., lead shot vest) disposed about the one or more weights 24. For example, the weighted covering may be disposed over the one or more weights 24 after the one or more weights 24 is stacked onto the one or more bars 14. In some embodiments, the weighted covering may be composed of a durable and flexible material (e.g., nylon, polyester) and include pockets of a weighting material (e.g., sand, metallic beads). It may be appreciated that the weighted covering may add additional weight to the ballast dummy system 10 and also serve as a protective barrier for the sensors.

In an embodiment, one or more magnets (e.g., permanent magnets) may be disposed in the one or more weights 24. For example, when the one or more weights 24 includes the multiple weights stacked relative to one another, the one or more magnets may facilitate alignment and securement of the multiple weights to one another via an attraction between respective magnets disposed in adjacent weights of the multiple weights stacked relative to one another. It should be appreciated that the support 12 may include one or more support magnets to facilitate alignment and securement of the support to the one or more weights 24 in a similar manner. The one or more magnets may be used as an alternative or an addition to the protrusions 48 and recesses 58, for example. It should be appreciated that the one or more magnets may include or refer to at least one magnet and a ferromagnetic material to facilitate these techniques.

In an embodiment, the base support 12 may include one or more handles disposed on lateral sides 90, 92 of the base support 12. The handles may be configured to be grasped by one or more operators for positioning (e.g., placing, retaining) the ballast dummy system 10 in the seat of the ride vehicle. In an embodiment, the handles may be configured to retract into the base support 12, so as to provide clearance when positioning the ballast dummy system 10 into the seat. In an embodiment, the handles may be formed via a concave portion of the base support 12 such that the handles do not extend past the lateral sides 90, 92.

Figure 2:
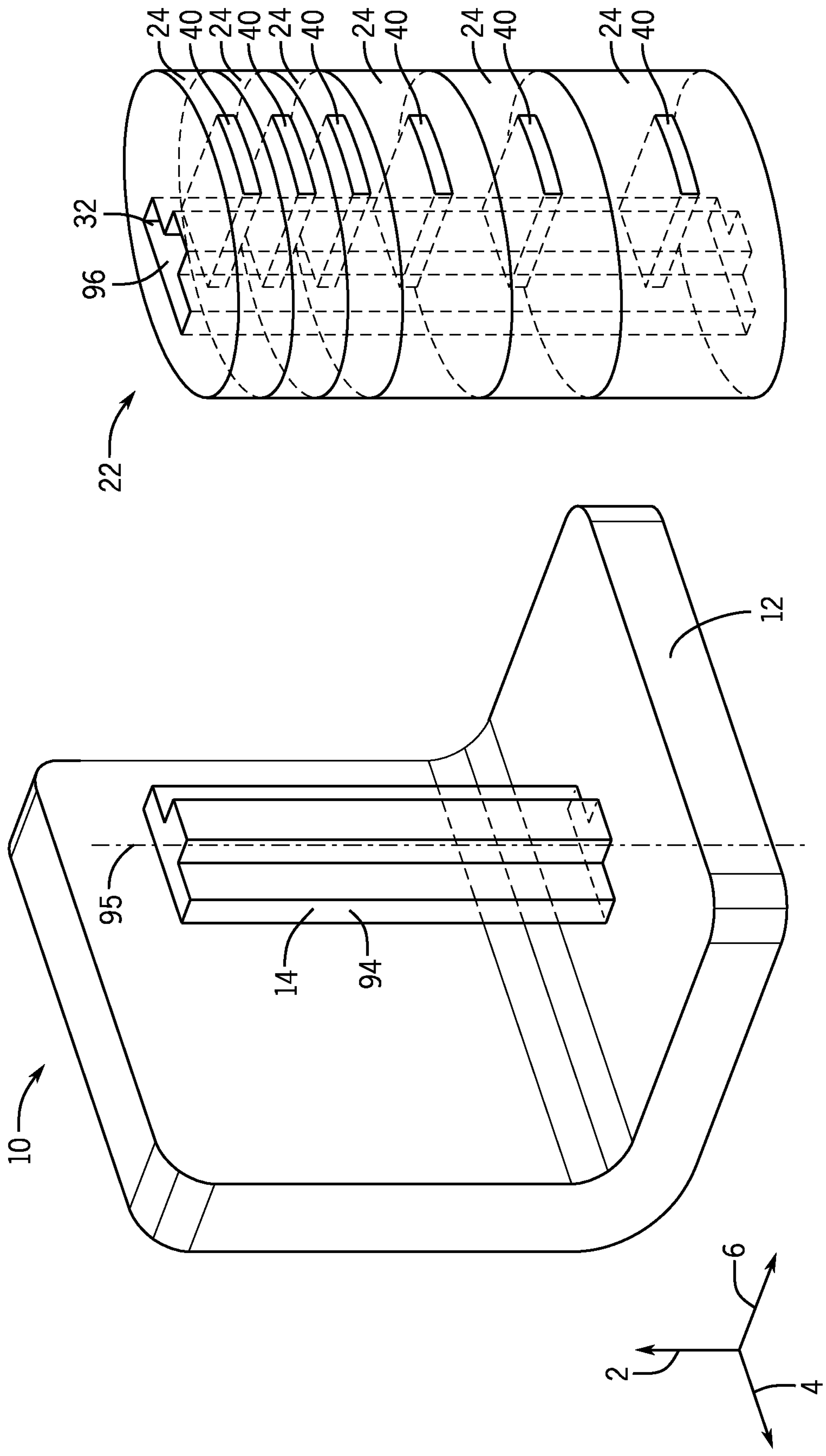
FIG. 2 is a perspective view of the ballast dummy system of FIG. 1 employing one or more bars that provide a cross-sectional area configured to block rotation of one or more weights about the one or more bars, in accordance with an aspect of the present disclosure.

FIG. 2 is a perspective view of an embodiment of the ballast dummy system 10, including the one or more bars 14 (e.g., bar 94) that provide a cross-sectional area configured to block rotation of the one or more weights 24 about the one or more bars 14. As discussed herein, the one or more bars 14 may be coupled to the base support 12 of the ballast dummy system 10. The cross-sectional area of the one or more bars 14 may be taken in a plane that is orthogonal to one or more central axes 95 of the one or more bars 14. As shown, the one or more central axes (e.g., longitudinal axes) are parallel to the vertical direction 2. The cross-sectional area of the one or more bars 14 may be configured such that each weight of the one or more weights 24 is placed onto the one or more bars 14 using a consistent orientation. In this manner, the one or more recesses 40 may consistently face a certain direction each time any weight of the one or more weights 24 is added to the one or more bars 14. In an embodiment, each weight of the one or more weights 24 may include one or more axial holes 32 (e.g., axial hole 96) that provide a corresponding cross-sectional area that corresponds to the cross-sectional areas of the one or more bars 14.

The corresponding cross-sectional area of the one or more axial holes 32 and the cross-sectional area of the one or more bars 14 may be configured to constrain motion of the one or more weights 24 along the lateral axes 4 and 6 (e.g., lateral plane). Further, the cross-sectional area of the one or more bars 14 may constrain rotation of the one or more weights 24 about the vertical axis 2. It should be appreciated that one or more fasteners may be coupled to ends portions of the one or more bars 14 to constrain motion of the one or more weights 24 along the vertical axis 2. In an embodiment, the one or more bars 14 may include multiple bars that are used to secure the one or more weights 24. In such cases, the multiple bars may each have a same cross-sectional area or a different cross-sectional area. For example, one of the multiple bars may have a T-shaped cross-sectional area and another one of the multiple bars may have a circular cross-sectional area. Although the illustrated embodiment shows the one or more bars 14 as having a T-shaped cross-sectional area, in an embodiment, at least one of the one or more bars 14 may have a cross-sectional area of another non-cylindrical shape (e.g., rectangular, square, triangular, diamond, elliptical). Additionally, in an embodiment, at least one respective axial hole of the one or more axial holes 32 includes a corresponding non-cylindrical shape configured to mate with the at least one bar having the non-cylindrical shape. When mated, the non-cylindrical shape of the at least one bar and the corresponding non-cylindrical shape of the respective axial hole block rotation of the one or more weights 24 about the at least one bar.

In the illustrated embodiment, the one or more axial holes 32 each have a non-circular cross-sectional shape corresponding to the cross-sectional shape of the one or more bars 14. Although the illustrated embodiment shows the one or more axial holes 32 as having a T-shaped cross-sectional area, in an embodiment, at least one of the one or more axial holes 32 may have a cross-sectional area of another non-circular shape (e.g., rectangular, square, triangular, diamond, elliptical). In an embodiment, at least one of the one or more axial holes 32 may include a corresponding cross-sectional area having a shape that is different than the shape of the cross-sectional area of the corresponding bar 14, but sufficient to still constrain motion of the one or more weights 24.

Figure 3:
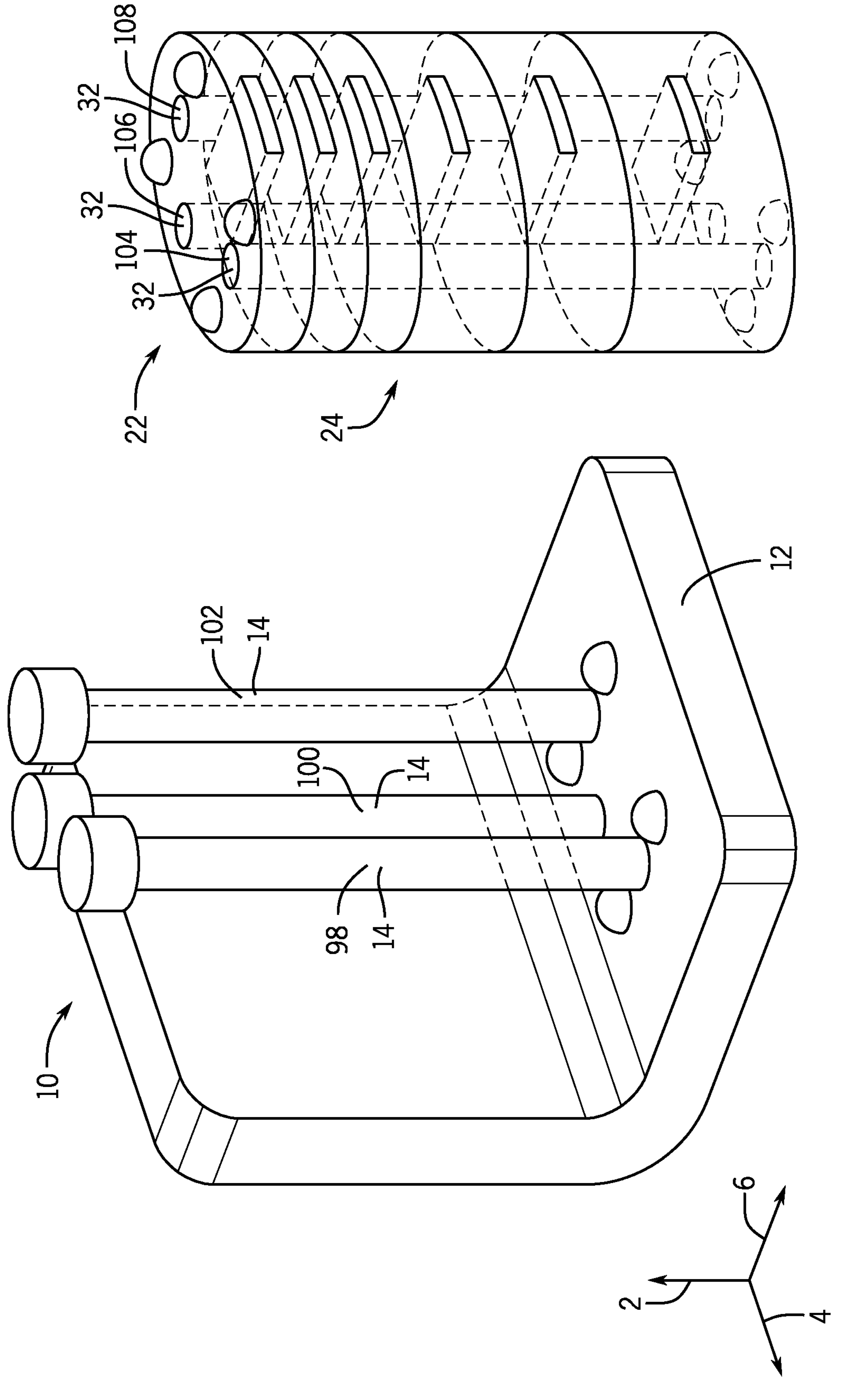
FIG. 3 is a perspective view of the ballast dummy system of FIG. 1 employing a three-bar configuration, in accordance with an aspect of the present disclosure.

FIG. 3 is a perspective view of an embodiment of the ballast dummy system 10 employing a three-bar configuration. In an embodiment, the one or more bars 14 include three bars (e.g., bars 98, 100, 102) coupled to the base support 12 and used for securing the one or more weights 24. In this manner, the three bars of the one or more bars 14 may constrain motion of the one or more weights 24 in the lateral directions 4 and 6 via engaging the one or more axial holes 32 (e.g., axial holes 104, 106, 108). It should be appreciated that the three bars of the one or more bars 14 may constrain rotation of the one or more weights 24 about the vertical axis 2 and the lateral axes 4 and 6. It should be appreciated that one or more fasteners may be coupled to end portions of the three bars of the one or more bars 14 to constrain motion of the one or more weights 24 along the vertical axis 2. In an embodiment, the three bars of the one or more bars 14 may be arranged on the base support 12 such that each bar of the three bars coincides with a vertex of an equilateral triangle. In an embodiment, the three bars of the one or more bars 14 may be arranged on the base support 12 such that each bar of the three bars coincides with a vertex of a non-equilateral (e.g., scalene, isosceles) triangle in order to assist in preventing and/or prevent an operator from misorienting the one or more weights 24 on the one or more bars 14. In an embodiment, the one or more bars 14 may include more than three bars to secure the one or more weights 24 to the base support 12. For example, the one or more bars 14 may include four bars, five bars, six bars, or more to secure the one or more weights 24 to the base support 12.

Figure 4:
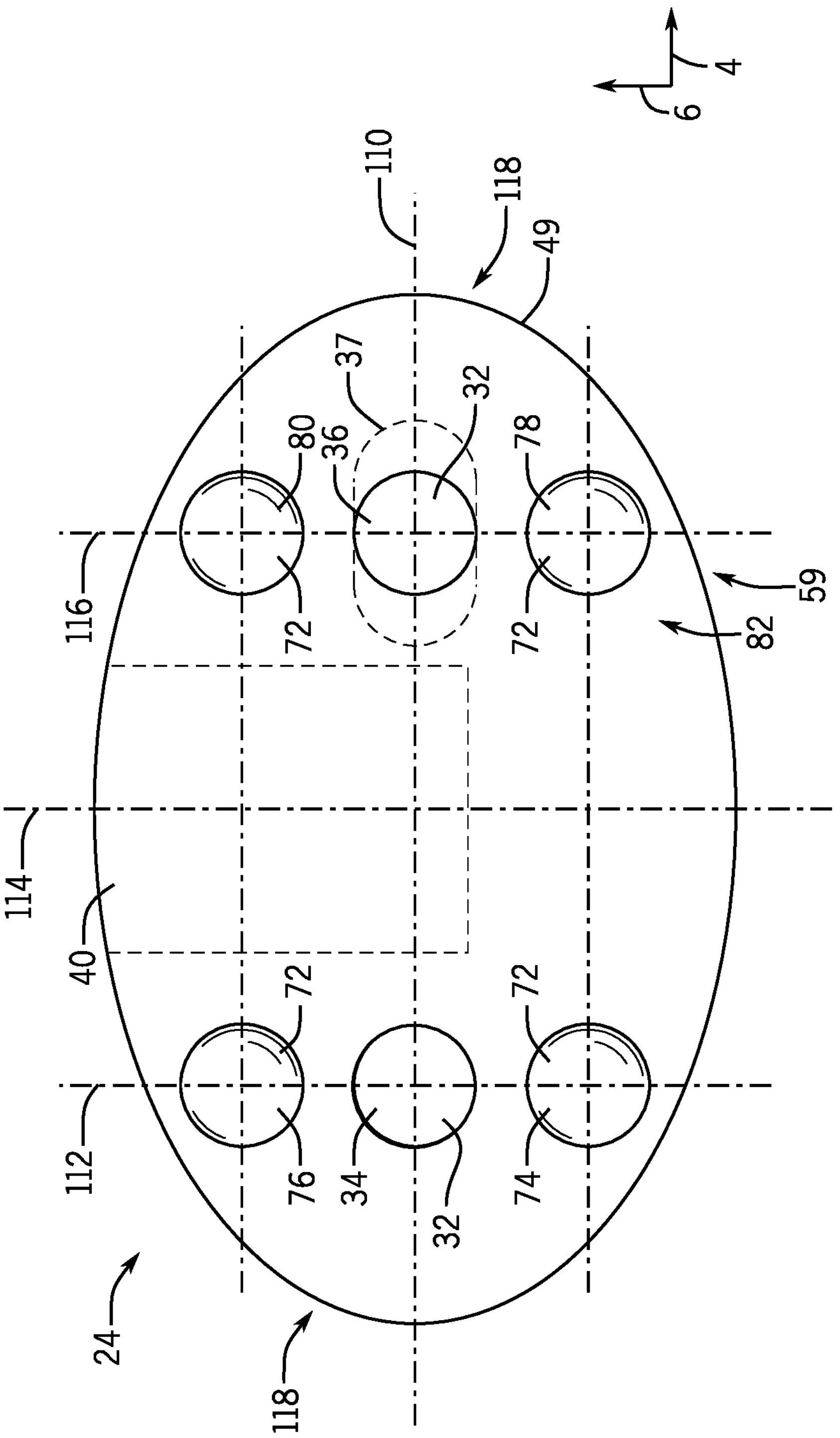
FIG. 4 is a top view of a weight of the ballast dummy system of FIG. 1, in accordance with an aspect of the present disclosure.

FIG. 4 is a top view of an embodiment of a weight of the one or more weights 24 of the ballast dummy system 10 shown in FIG. 1. To facilitate discussion with reference to FIG. 4, the weight of the one or more weights 24 is referred to as "the weight 24." As shown, the weight 24 includes axial holes 34, 36 disposed along a central axis 110 (e.g., major axis) of the weight 24. The weight 24 may also include the protrusions 74 and 76 disposed along a lateral axis 112 of the axial hole 34, the lateral axis 112 being substantially parallel to a central axis 114 (e.g., minor axis) of the weight 24. Additionally, the weight 24 may include the protrusions 78 and 80 disposed along a lateral axis 116 of the axial hole 36, the lateral axis 116 being substantially parallel to the central axis 114. The protrusions 74 and 76 may be at a substantially equal offset in direction 6 as the protrusions 78 and 80, respectively. The weight 24 also includes a respective recess 40 disposed between the axial holes 34, 36. Although the illustrated embodiment shows one recess 40, the weight 24 may include one or more recesses 40 for retaining one or more sensors. A similar arrangement as shown and described above with reference to FIG. 1 may also be applicable to provide the recesses 58 on the bottom axial end 59 of the weight 24.

In an embodiment, the protrusions 74 and 76 may each be laterally offset from the axial hole 34 along different lateral axes. Similarly, the protrusions 78 and 80 may each be offset from the axial hole 36 along different lateral axes. In some embodiments, the protrusions 74, 76, 78, and 80 may be offset from the axial holes 32, 34 at varying distances and angles. It should be appreciated that the recesses 58 on the bottom axial end 59 of the weight 24 may have similar configurations and/or variations in configurations.

Although the weight 24, as shown, has an elliptical cross-sectional shape, the weight 24 may include any of a variety of other cross-sectional shapes. For example, in some embodiments, the weight 24 may be circular, square, rectangular, or polygonal (e.g., trapezoidal). In some embodiments, the weight 24 may be kidney bean-shaped. As discussed herein, different weights of the one or more weights 24 may have different shapes depending on one or more factors (e.g., weight value and/or mass value).

In an embodiment, the weight 24 may include one or more handles disposed about the outer surface 49 for improving the ergonomics of the weight 24 when adding (e.g., stacking) the weight 24 to the one or more bars 14, such as the one or more bars 14 of FIG. 1. In an embodiment, the weight 24 may include two handles on opposite lateral ends 118 of the weight 24. In some embodiments, one or more handles may be disposed on one or more portions of the outer surface 49. In an embodiment, the handles may include one or more apertures (e.g., concavities) disposed in the weight 24.

In an embodiment, the weight 24 may include one or more slots 37, such as in place of at least one axial hole of the one or more axial holes 32. In other words, when the one of the one or more axial holes 32 comprises more than one axial hole 32, a first axial hole of the one or more axial holes is substantially round. By being round, the first axial hole 32 facilitates constraining the motion of the one or more weights 24 along the lateral plane formed by lateral axes 4 and 6. One or more remaining axial holes 32 of the one or more axial holes 32 may have an elongated shape (e.g., to form or to be the one or more slots 37). It should be recognized that by using the one or more slots 37 in place of at least one axial hole of the one or more axial holes 32, the one or more weights 24 may still be placed onto the one or more bars 14 even if respective geometries of the one or more weights 24 and the support 12 do not precisely match one another. For example, even if a respective distance between the one or more axial holes 32 (at least one of which is formed with the elongated shape to be the one or more slots 37) along the lateral axis 4 does not precisely match a respective distance between the one or more bars 14 along the lateral axis 4, such as due to manufacturing tolerances and/or differences, the one or more weights 24 may still fit onto the one or more bars 14. Further, the one or more bars 14 may still block rotation and movement of the one or more weights 24, as described herein.

Figure 5:
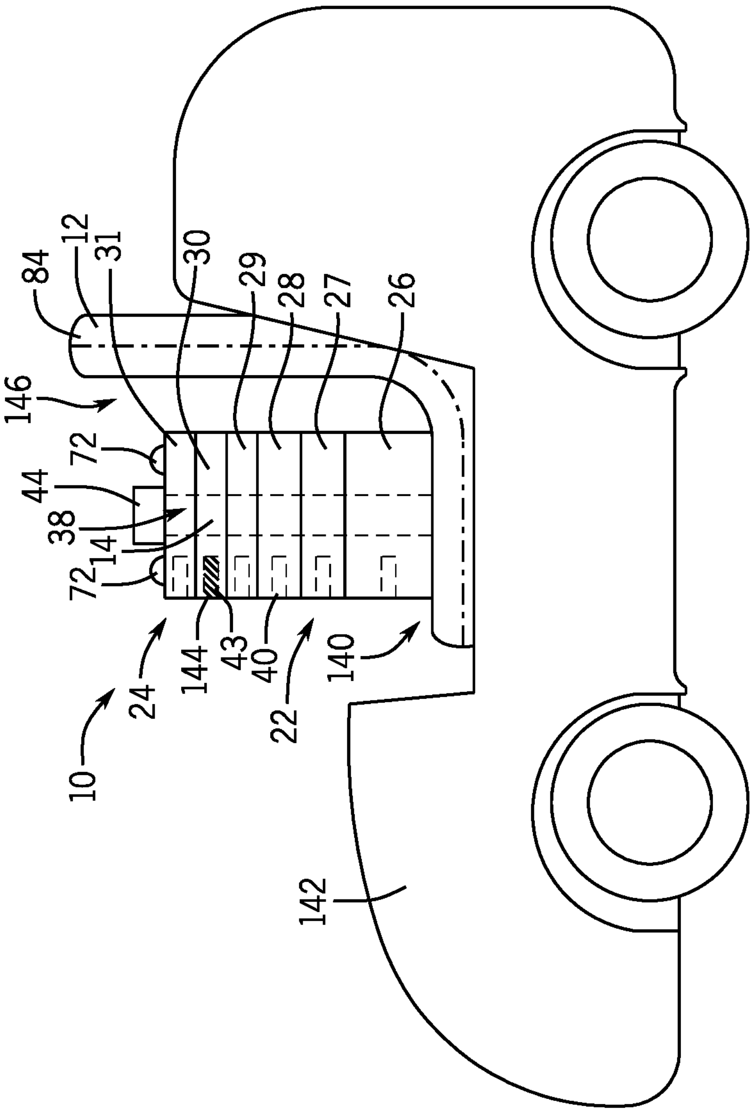
FIG. 5 is a side view of the ballast dummy system of FIG. 1, including a first configuration of weights, in accordance with an aspect of the present disclosure.

FIG. 5 is a side view of an embodiment of the ballast dummy system 10 of FIG. 1, including a first configuration of the one or more weights 24. As shown, the ballast dummy system 10 is retained (e.g., secured) in a seat 140 of a ride vehicle 142 of an amusement ride via retaining the 92 12 in the seat 140. In an embodiment, the first configuration of the one or more weights 24 may include the weight 26 (e.g., heavier weight) being stacked below other weights of the one or more weights 24. The one or more weights 24 are retained onto the one or more bars 14 via the fasteners 44. Each weight of the one or more weights 24 includes the protrusions 72 on its respective top axial end and the recesses on its respective bottom axial end. Additionally, as shown, at least one weight of the one or more weights 24 includes the one or more recesses 40. The first configuration of the one or more weights 24 may include at least one sensor 144 disposed in the recess 43 of the weight 30 (e.g., lighter weight), which is positioned near a top of the one or more weights 24. In an embodiment, the first configuration of the one or more weights 24 may include a different arrangement of the one or more weights 24. Additionally or alternatively, the at least one sensor 144 may be retained in another recess of the one or more recesses 40 and/or multiple sensors 144 may be retained in multiple recesses 40.

In the illustrated embodiment, a gap 146 is present between the one or more weights 24 and the back support portion 84 of the base support 12. In other embodiments, there may be a small gap or no gap (e.g., contact) between the one or more weights 24 and the back support portion 84. In some embodiments, a bracket (e.g., support structure) may be used to couple the one or more weights 24 to the back support portion 84 via attaching to the top portions 38 of the one or more bars 14 and/or to at least one of the one or more weights 24. In this manner, the one or more weights 24 may be supported at both ends of the one or more bars 14.

Figure 6:
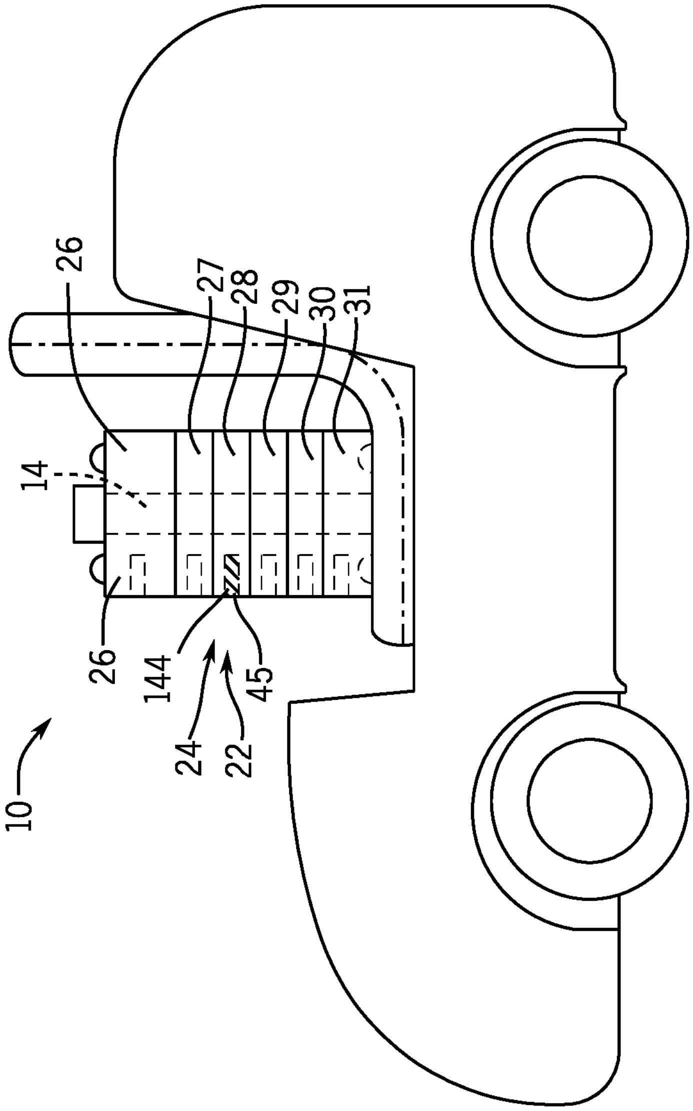
FIG. 6 is a side view of the ballast dummy system of FIG. 1, including a second configuration of weights, in accordance with an aspect of the present disclosure.

FIG. 6 is a side view of an embodiment of the ballast dummy system 10 of FIG. 1, including a second configuration of the one or more weights 24. In an embodiment, the second configuration of the one or more weights 24 may include the weight 26 (e.g., heavier weight) being disposed above the other weights of the one or more weights 24. The second configuration may also include the at least one sensor 144 disposed in the recess 45 of the weight 28, which is positioned near a middle of the stack of the one or more weights 24. In an embodiment, other configurations other than the first and second configurations of the one or more weights 24 may be used for ordering the one or more weights 24 (e.g., axially stacking multiple weights of the one or more weights 24) and/or for placing the at least one sensor 144 (e.g., at different axial positions). That is, the one or more weights 24 may be arranged on the one or more bars 14 in any order different than the order shown in FIGS. 3 and 4.

Figure 7:
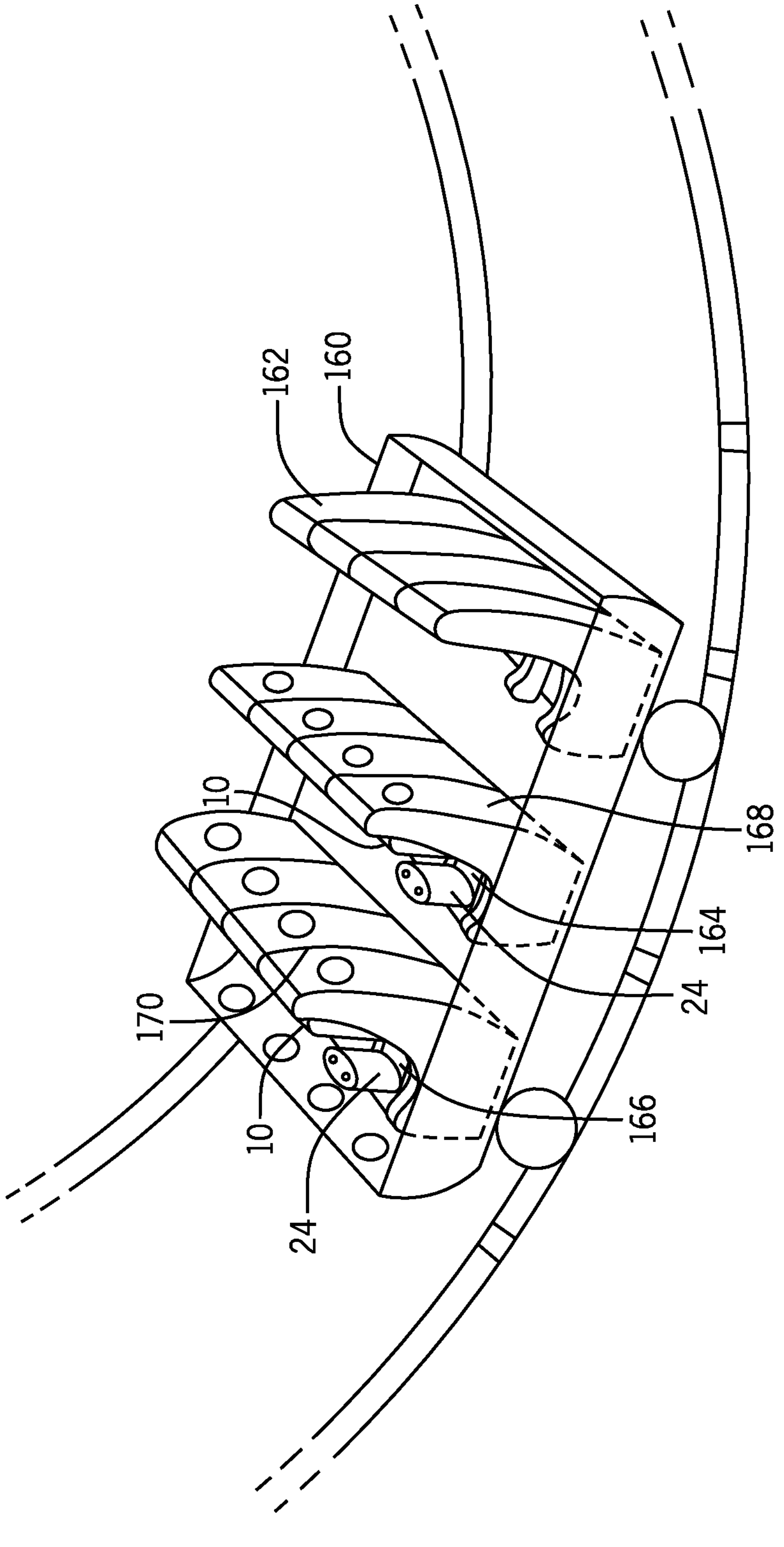
FIG. 7 is a perspective view of a ride vehicle having multiple seats being tested with multiple of the ballast dummy system of FIG. 1, in accordance with an aspect of the present disclosure.

FIG. 7 is a perspective view of an embodiment of a ride vehicle 160 having multiple seats 162 being tested with multiple of the ballast dummy system 10 of FIG. 1. As shown, one or more ballast dummy systems 10 (e.g., ballast dummy system 164, 166) may be used in the one or more seats 162 (e.g., seats 168, 170) during a single test run (e.g., trial run) of the amusement ride. That is, one or more of the multiple seats 162 may be outfitted with (e.g., retain) a separate ballast dummy system 10. In an embodiment, the arrangement (e.g., ordering) of the one or more weights 24 of the ballast dummy system 164 may be different than the arrangement (e.g., ordering) of the one or more weights 24 of the ballast dummy system 166. For example, the ballast dummy system 164 may include lighter weights selected from the one or more weights 24 corresponding to a lighter person, while the ballast dummy system 166 may include heavier weights selected from the one or more weights 24 corresponding to a heavier person. In an embodiment, additional ballast dummy systems 10 (e.g., in addition to the ballast dummy systems 164, 166) may be used during a testing of the ride vehicle 160. In this manner, the one or more of the seats 162 may be tested concurrently using ballast dummy systems 10 having different configurations.

In an embodiment, each ballast dummy system 10 of one or more of the ballast dummy systems 10 may be moved to a respective different seat between test runs of the ride vehicle 160. For example, the ballast dummy system 164 may be moved from the seat 168 to the seat 170 between test runs of the ride vehicle 160. In this manner, kinematic data may be collected via the sensor(s) from one or more of the multiple seats 162 via moving the one or more ballast dummy systems 10 from one respective seat to another respective seat.

Figure 8:
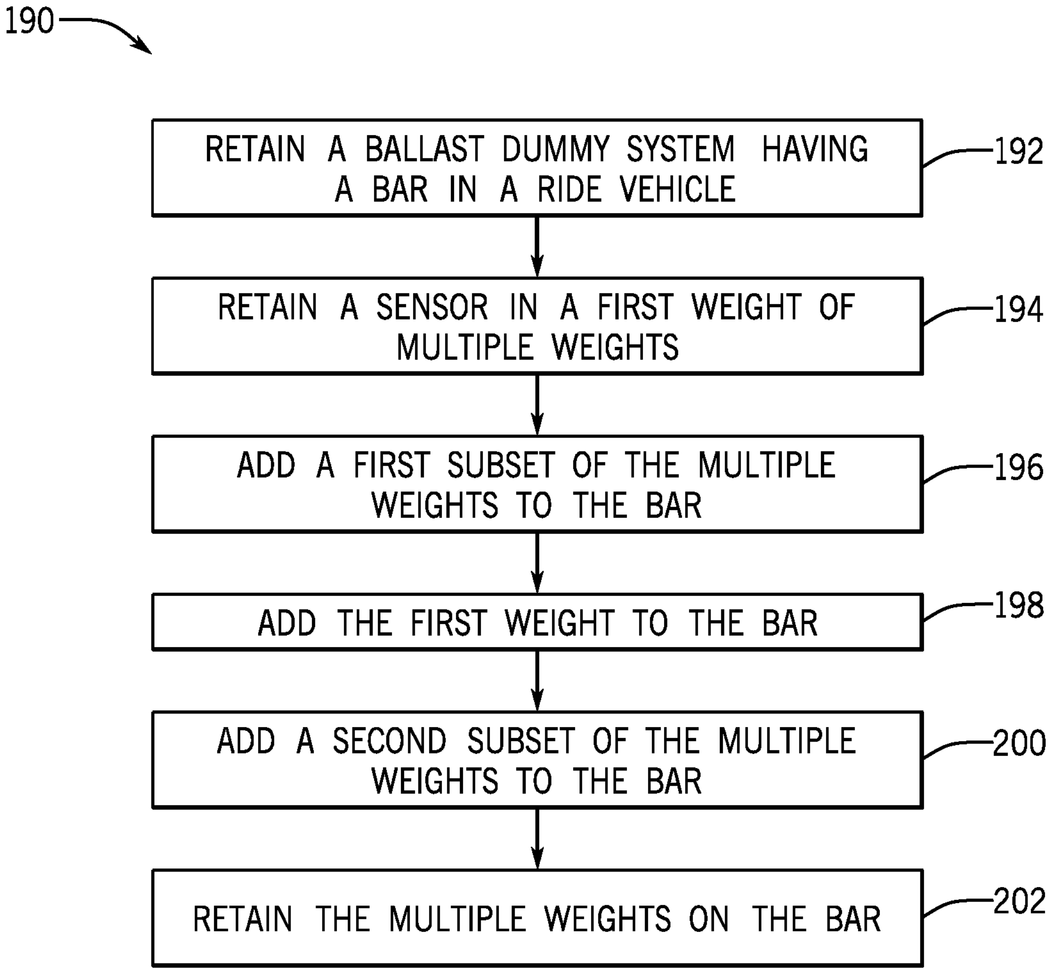
FIG. 8 is a flowchart of a method employed to operate the ballast dummy system of FIG. 1, in accordance with an aspect of the present disclosure.

FIG. 8 is a flowchart of an embodiment of a method 190 employed to operate the ballast dummy system 10 of FIG. 1. To facilitate discussion with reference to FIG. 8, the one or more weights 24 includes multiple weights, which are referred to as "multiple weights 24" and "the multiple weights 24." Further, the one or more bars 14 include a single bar, which is referred to as "a bar 14" and "the bar 14." Further, the at least one sensor 44 includes a single sensor, which is referred to as "a sensor 44" and "the sensor 44." Further, the one or more recesses 40 includes a single recess, which is referred to as "a recess 44" and "the recess 44." However, it should be appreciated that the multiple weights 24 may include any number of weights, the bar 14 may include any number of bars, the sensor 44 may include any number of sensors, and the recess 40 may include any number of recesses.

As shown, the method 190 includes retaining (block 192) a ballast dummy system 10 having a bar 14 (e.g., vertical bar) in a ride vehicle. Retaining the ballast dummy system 10 in the ride vehicle may include securing the ballast dummy system 10 via a restraint of the ride vehicle 142 (e.g., lap bar, overhead restraint). Additionally or alternatively, retaining the ballast dummy system 10 may include wrapping one or more tie-down straps (e.g., lashing straps) around the ballast dummy system 10 and the seat 140 of the ride vehicle 142.

The method 190 also includes retaining (block 194) a sensor 144 in a first weight (e.g., weight 26) of multiple weights 24. Retaining the sensor 144 in the first weight may include tightening a clamp disposed in a recess 40 to retain the sensor 144 in the recess 40. Retaining the sensor 144 may also include closing a door (e.g., lid) of the recess 40 to block the sensor 144 from sliding out of the recess 40.

The method 190 also includes adding (e.g., stacking) (block 196) a first subset of the multiple weights 24 onto the bar 14. Adding the first subset of the multiple weights 24 may include aligning the bar 14 with one or more axial holes 32 disposed on each weight of the first subset of the multiple weights 24. Adding the first subset of the multiple weights 24 may also include a travel of the bar 14 through the one or more axial holes 32 (e.g., via lowering each weight of the first subset of the multiple weights 24 over the bar 14).

In any case, adding the first subset of the multiple weights 24 may include aligning recesses 58 disposed on a bottom axial end 59 of a lowermost weight 24 of the first subset of the multiple weights 24 with protrusions 48 disposed on the base support 12. Additionally, adding the first subset of the multiple weights 24 may include aligning the respective recesses 58 disposed on the respective bottom axial ends 59 of each weight in the first subset of the multiple weights 24 with the respective protrusions 48 disposed on the respective top axial ends 82 of each weight in the first subset of the multiple weights 24.

The method 190 also includes adding (block 198) the first weight (e.g., the weight 26; the weight 24 having the sensor 144) onto (e.g., about, at least partially around) the bar 14. Adding the first weight of the multiple weights 24 may include aligning the bar 14 with the one or more axial holes 32 disposed on the first weight. Adding the first weight may also include a travel of the bar 14 through the one or more axial holes 32 (e.g., via lowering the first weight over the bar 14).

In any case, adding (e.g., stacking) the first weight may include aligning the respective recesses 58 disposed on the respective bottom axial end 59 of the first weight with the respective protrusions 48 disposed on the respective top axial end 82 of one weight of the first subset of the multiple weights 24 previously added onto the bar 14. Adding the first weight may also include electrically coupling the sensor 144 (e.g., via an electrical contact) to a battery and/or transmitter stowed in another portion of the ballast dummy system 10. It should be appreciated that one or more additional weights of the multiple weights 24 may include one or more additional sensors 44, and the one or more additional weights 24 may be added with the first weight in a similar manner.

The method 190 also includes adding (block 200) a second subset of the multiple weights 24 onto the bar 14. Adding the second subset of the multiple weights 24 may include aligning the bar 14 with the one or more axial holes 32 disposed on each weight of the second subset of the multiple weights 24. Adding the second subset of the multiple weights 24 may also include a travel of the bar 14 through the one or more axial holes 32 (e.g., via lowering each weight of the second subset of the multiple weights 24 over the bar 14).

In any case, adding the second subset of the multiple weights 24 may include aligning the respective recesses 58 disposed on the respective bottom axial end 59 of a lowermost weight 24 of the second subset of the multiple weights 24 with the respective protrusions 48 disposed on the first weight. Additionally, adding the second subset of the multiple weights 24 may include aligning the respective recesses 58 disposed on the respective bottom axial ends 59 of each weight in the second subset of the multiple weights 24 with the respective protrusions 48 disposed on the respective top axial ends 82 of each weight in the second subset of the multiple weights 24.

The method 190 also includes retaining (block 202) the multiple weights 24 (e.g., the first weight, the first and second subset of the weights 24) onto the bar 14. In an embodiment, retaining the multiple weights 24 may include tightening one or more fasteners 44 to a respective top portion 38 of the bar 14. In an embodiment, retaining the multiple weights 24 may include retaining the multiple weights 24 via a bracket coupling the respective top portion 38 to a back support portion 84. In an embodiment, the sensor 144 retained in of the first weight of the multiple weights 24 may be moved to another weight of the multiple weights 24 (e.g., moved from weight 26 to weight 28) before and/or after the multiple weights 24 are retained onto the bar 14.

Accordingly, the ballast dummy system and related techniques disclosed herein enable efficient coupling of the base support to a variety of seats in a variety of ride vehicles, as well as efficient stacking of selected weights (e.g., selected from a set of available weights based on desired test parameters). For example, an operator may select one or more first weights from one or more available weights for a first test protocol, and then select one or more second weights from the one or more available weights for a second test protocol. Further, the ballast dummy system and related techniques disclosed herein enable efficient coupling of one or more sensors to the selected weights, as well as readily adjustable configurations via stacking the selected weights in any desired order to mimic different human body types, to place the sensor at any desired position relative to the base support and/or the seat, and/or to change test parameters over time (e.g., selected weights, stacked order, sensor position over multiple ride cycles), for example.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that features shown and described with reference to FIGS. 1-8 may be combined in any suitable manner. For example, the embodiments of the ballast dummy system 10 shown in FIGS. 2 and 3 may be utilized in the ride vehicles 142, 160 of FIGS. 5 and 7.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ballast dummy system, comprising:

a base support configured to be retained in a seat of a ride vehicle of an amusement ride;

at least one bar coupled to the base support and extending in an axial direction, wherein the axial direction is transverse to an axially-facing surface of the base support; and a plurality of weights configured to be arranged in a stack on the at least one bar along the axial direction, wherein each weight of the plurality of weights comprises at least one axial hole configured to engage the at least one bar to retain the weight on the base support, and at least one weight of the plurality of weights comprises a recess formed into an outer surface of the at least one weight, and the recess is configured to receive a sensor;

wherein the at least one bar is configured to block rotation of the plurality of weights about a longitudinal axis of the at least one bar while the stack is engaged with the at least one bar, and wherein the recess is exposed to an exterior of the ballast dummy system to enable access to the sensor while the stack is engaged with the at least one bar.

2. The ballast dummy system of claim 1, wherein the at least one bar is configured to constrain motion of the stack in a lateral plane.

3. The ballast dummy system of claim 1, wherein a respective top portion of the at least one bar is configured to extend past the stack in the axial direction to retain the stack on the base support.

4. The ballast dummy system of claim 3, comprising a fastener configured to retain the stack via an engagement of the fastener and the top portion of the at least one bar.

5. The ballast dummy system of claim 1, wherein the plurality of weights comprises a first weight and a second weight, and the first weight comprises a first weight value and the second weight comprises a second weight value.

6. The ballast dummy system of claim 1, wherein the base support comprises a back support configured to be disposed between the stack and the seat of the ride vehicle, and the back support is configured to block the stack from making contact with a back of the seat.

7. The ballast dummy system of claim 1, wherein the base support comprises a first protrusion disposed on the axially-facing surface of the base support and offset from the at least one bar.

8. The ballast dummy system of claim 7, wherein a first weight of the plurality of weights comprises a first recess disposed on a respective first axial end of the first weight of the plurality of weights, and a first engagement of the first recess with the first protrusion is configured to block a first rotation of the first weight of the plurality of weights about the at least one bar.

9. The system of claim 1, wherein each weight of the plurality of weights is configured to disengage from the at least one bar.

10. The system of claim 1, wherein the outer surface comprises an outer radial surface of the weight.

11. The system of claim 1, wherein each weight of the plurality of weights comprises a respective recess.

12. The system of claim 11, wherein the respective recess of each weight of the plurality of weights is accessible to an operator while the stack is engaged with the at least one bar.

13. A ballast dummy system, comprising:

a base support configured to be retained in a seat of a ride vehicle;

one or more bars coupled to the base support and extending in an axial direction, wherein the axial direction is transverse to an axially-facing surface of the base support; and a plurality of weights configured to be arranged in a stack on the one or more bars along the axial direction, wherein each weight of the plurality of weights comprises one or more axial holes configured to engage respective bars of the one or more bars, at least one weight of the plurality of weights comprises a recess formed into an outer surface of the at least one weight, and the recess is configured to receive a sensor;

wherein the recess is exposed to an exterior of the ballast dummy system to enable access to the sensor while the stack is engaged with the one or more bars.

14. The ballast dummy system of claim 13, wherein the plurality of weights is configured to be arranged with individual weights of the plurality of weights in a first stacked order on the one or more bars during one test period and to be arranged with the individual weights of the plurality of weights in a second stacked order on the one or more bars during another test period, and the first stacked order is different than the second stacked order.

15. The ballast dummy system of claim 13, comprising one or more fasteners configured to retain the stack via an engagement of each fastener of the one or more fasteners and a respective bar of the one or more bars.

16. The ballast dummy system of claim 15, wherein at least one weight of the plurality of weights is configured to engage the base support via a key-slot interface.

17. The ballast dummy system of claim 13, wherein the outer surface comprises an outer radial surface.

18. The ballast dummy system of claim 13, wherein the one or more bars comprise a plurality of bars, the one or more axial holes comprise a plurality of axial holes, and a first spacing of the plurality of bars corresponds to a second spacing of the plurality of axial holes.

19. The ballast dummy system of claim 13, wherein at least one bar of the one or more bars includes a non-cylindrical shape, at least one respective axial hole of the one or more axial holes includes a corresponding non-cylindrical shape configured to mate with the at least one bar having the non-cylindrical shape;

wherein, when mated, the non-cylindrical shape of the at least one bar and the corresponding non-cylindrical shape of the at least one respective axial hole block rotation of a respective weight of the plurality of weights about the at least one bar.

20. A method, comprising:

retaining a ballast dummy in a seat of a ride vehicle, wherein the ballast dummy comprises a bar extending in an axial direction, wherein the axial direction is transverse to an axially-facing surface of the ballast dummy;

retaining a sensor in a first recess formed into a first outer surface of a first weight of a plurality of weights;

retaining the first weight to the bar via engaging an axial hole of the first weight with the bar;

retaining one or more additional weights of the plurality of weights to the bar via engaging a respective axial hole of each additional weight of the one or more additional weights with the bar to form a stack along the axial direction; and removing, while the stack is retained on the bar, the sensor from the first recess.

21. The method of claim 20, comprising retaining, while the stack is retained on the bar, the sensor in a second weight of the one or more additional weights, wherein the second weight is different than the first weight.

* * * * *